(12) United States Patent
Wakonig (10) Patent No.: US 12,065,793 B2
(45) Date of Patent: Aug. 20, 2024

(54) WALL ELEMENT

(71) Applicant: Martin Wakonig, Vienna (AT)

(72) Inventor: Martin Wakonig, Vienna (AT)

( * ) Notice: Subject to any disclaimer, the term of this patent is extended or adjusted under 35 U.S.C. 154(b) by 529 days.

(21) Appl. No.: 17/276,208

(22) PCT Filed: Sep. 19, 2019

(86) PCT No.: PCT/AT2019/060309
§ 371 (c)(1),
(2) Date: Mar. 15, 2021

(87) PCT Pub. No.: WO2020/056441
PCT Pub. Date: Mar. 26, 2020

(65) Prior Publication Data
US 2022/0034052 A1     Feb. 3, 2022

(30) Foreign Application Priority Data
Sep. 19, 2018    (AT) ............................. A 50801/2018

(51) Int. Cl.
   *E01F 8/00*           (2006.01)
   *E04B 1/84*           (2006.01)
   *H02S 20/20*         (2014.01)

(52) U.S. Cl.
CPC .............. *E01F 8/0023* (2013.01); *E04B 1/84* (2013.01); *H02S 20/20* (2014.12)

(58) Field of Classification Search
CPC .......... A61P 25/24; A61P 25/08; A61P 25/00; A61P 25/18; A61K 31/4365;
(Continued)

(56) References Cited

U.S. PATENT DOCUMENTS 5,005,557 A * 4/1991 Bachli .................. E06B 3/6775
                                                          52/786.13
5,205,091 A * 4/1993 Brown .............. E04F 15/02429
                                                            52/126.6

(Continued)

FOREIGN PATENT DOCUMENTS

| CN | 202577174 U | 12/2012 |
|---|---|---|
| CN | 203452016 U | 2/2014 |

(Continued)

OTHER PUBLICATIONS

International Search Report from Corresponding International Application No. PCT/AT2019/060309 mailed Dec. 5, 2019.

(Continued)

*Primary Examiner* — Chi Q Nguyen
(74) *Attorney, Agent, or Firm* — Pearne & Gordon LLP (57) ABSTRACT

A wall element is provided for a noise protection wall. The wall element has a body and at least one outer face. The body has a support towards the at least one outer face, and at least one solar panel is arranged on the support and is connected to the body. The solar panel is inclined relative to a vertical in the direction of an upper face of the wall element. The body has on the at least one outer face at least one sound absorption surface which can be directly reached by incoming sound. The sound absorption surface is inclined at least in some sections relative to the vertical and/or relative to a longitudinal direction of the wall element, and the area of the sound absorption surface is at least equal to the area of a visible face of the wall element.

11 Claims, 5 Drawing Sheets

(58) Field of Classification Search
CPC ........ C07D 495/04; E01F 8/00; E01F 8/0005; E01F 8/0017; E01F 8/0011; E01F 8/0023; H02S 20/00; H02S 20/20; H02S 20/21; H02S 20/26; H02S 20/22; E04B 1/84; E04B 1/74; Y02B 10/10; Y02B 10/00
See application file for complete search history.

(56) References Cited

U.S. PATENT DOCUMENTS

| | | | | |
|---|---|---|---|---|
| 5,596,981 | A | * | 1/1997 | Soucy .................... F24S 80/58 126/707 |
| 5,670,758 | A | * | 9/1997 | Borchers ................ F41B 15/08 181/294 |
| 11,726,383 | B2 | * | 8/2023 | Hajimiri ............... H04B 10/25 385/8 |
| 2012/0233939 | A1 | * | 9/2012 | Prentice ................. F24S 25/15 52/173.3 |
| 2014/0096463 | A1 | * | 4/2014 | Prentice ................. E04D 3/405 52/173.3 |
| 2014/0259964 | A1 | * | 9/2014 | Rickie .................. E04D 13/174 52/302.1 |
| 2017/0272028 | A1 | * | 9/2017 | Reinert .............. E04H 12/2215 |
| 2018/0226917 | A1 | * | 8/2018 | Jacques ................... E04B 2/72 |

FOREIGN PATENT DOCUMENTS

| | | |
|---|---|---|
| CN | 203807964 U | 9/2014 |
| CN | 104695346 A | 6/2015 |
| CN | 207295515 U | 5/2018 |
| DE | 93 18 768 U1 | 4/1994 |
| DE | 196 02 779 A1 | 7/1997 |
| DE | 297 06 785 U1 | 9/1997 |
| DE | 20 2011 004 458 U1 | 5/2011 |
| EP | 1 788 155 A2 | 5/2007 |
| EP | 2 363 531 A2 | 9/2011 |
| GB | 2 002 837 A | 2/1979 |
| KR | 2011-0071418 A | 6/2011 |
| KR | 2018-0022124 A | 3/2018 |
| RU | 2 557 272 C1 | 6/2014 |

OTHER PUBLICATIONS

Written Opinion from Corresponding International Application No. PCT/AT2019/060309 dated Dec. 5, 2019.
Office Action dated Mar. 6, 2019 for corresponding Austrian Application No. A 50801/2018.
Russian Examination Notice issued in corresponding Application No. 2021110745/03; Dated: Dec. 23, 2022.
German translation of Russian Examination Notice (see Non-Patent Literature Document citation #1) issued in corresponding Application No. 2021110745.
Russian Search Report issued in corresponding Application No. 2021110745/03; Completion date: Dec. 22, 2022.
Office Action issued in corresponding Chinese application, 201980061576.X, dated Oct. 25, 2023.

* cited by examiner

WALL ELEMENT

CROSS-REFERENCE TO RELATED APPLICATIONS

This is a National Stage application of PCT international application PCT/AT2019/060309 filed on Sep. 9, 2019, which claims the priority of Austrian Patent Application No. A 50801/2018, filed Sep. 9, 2018, which are incorporated herein by reference in their entireties.

FIELD OF THE INVENTION

The invention relates to a wall element for a noise protection wall, wherein the wall element has a body and at least one outer side, wherein the body has a support towards the at least one outer side, wherein at least one solar panel is arranged on the support and is connected to the body, wherein the solar panel is inclined relative to a vertical in the direction of an upper side of the wall element, wherein the body on the at least one outer side has at least one sound absorption surface which can be reached directly by incoming sound.

BACKGROUND OF THE INVENTION

A linking of noise protection components with photovoltaic modules and the associated general advantages have fundamentally been known for some time. A basic problem with this linking consists in that the surface of the photovoltaic modules is generally sound-reflecting and therefore is diametrically opposite to the strived—for properties of a noise protection component.

A circumvention of this problem is described, for example, in DE 93 18 768 U1. There a photovoltaic laminate is arranged parallel to the plane of extension of a noise protection component on the rear side thereof. The front side of the noise protection component thus remains unused for energy generation. Apart from this, with a vertical arrangement of the noise protection component, the optimal efficiency of the photovoltaic module is not achieved as a result of its then likewise vertical arrangement.

In another context, namely not for wall elements but for existing sound protection walls, a solution of these problems is known from DE 20 2011 004 458 U1. Disclosed therein is a sound protection system in which a plurality of solar modules are arranged in an inclined arrangement on a sound protection wall. The solar modules are in this case connected to a supporting structure independently of the sound protection elements actually provided so that solar modules and sound protection elements can be exchanged independently of one another. However, this results in the disadvantage that the overall expenditure for the assembly of the sound protection wall is significantly higher than that for a conventional sound protection wall (without solar modules).

In order to eliminate this disadvantage, a combined wall element is already known from KR 2018 0022124 A1 which combines both functions, namely sound absorption and photovoltaics. The expenditure for the construction of a corresponding noise protection wall is therefore barely higher than that for a conventional noise protection wall and furthermore comprises substantially only the production of the electrical connections. A disadvantage with this wall element however is its complex structure and associated with this the large number of components required as well as ultimately the resulting high manufacturing costs.

DE 196 02 779 A1 discloses a wall element of the type mentioned initially, which at least partially avoids or alleviates the aforesaid disadvantages. The wall elements are in this case formed by prefabricated components, wherein the solar modules are fastened to lugs moulded thereon in one piece. The surface of the prefabricated components which can be reached directly by horizontally incoming sound, i.e. which is not covered by the solar module, is small compared with the entire visible face.

DE 297 06 785 U1 discloses a sound protection wall in which horizontal sound protection elements are fastened between two perpendicularly mounted supports. The sound protection walls are spanned by rectangular non-isosceles prismatic bodies and stack in a self-supporting manner in guides on the supports. The smaller prism leg side of each prismatic body is formed by a solar panel and is arranged so that it points upwards and the longer prism leg side is configured as a sound protection arrangement and arranged to be facing downwards.

EP 1 788 155 A2 discloses an ecological noise protection wall in lightweight design with vertical supports anchored in a foundation and wedge-shaped sound-absorbing elements which comprises a sound-absorbing sound-absorbing material and a roofing for protection against influences of weather. In this case, the sound-absorbing material consists of natural and renewable raw materials made of straw, haulm or fibres of plant origin.

The solutions known from KR 2018 0022124 A1 and DE 196 02 779 A1 attempt to solve the basic problem mentioned initially of the inferior sound absorption properties of the individual elements due to the use of solar modules whereby the sound is to be diverted in each case into chambers behind the solar modules in order to be absorbed there. However, in practice such a diversion does not function to a sufficient extent in order to be able to fulfil the increasingly restrictive requirements on the degree of sound absorption by noise protection walls.

BRIEF SUMMARY OF THE INVENTION

It is the object of the invention to eliminate or at least reduce this disadvantage.

The invention provides a wall element of the type mentioned initially wherein the sound absorption surface is inclined at least in some sections relative to the vertical and/or relative to a longitudinal direction of the wall element, wherein the area of the sound absorption surface is at least equal to the area of an elevation view (or elevation view area) of the wall element. The sound absorption surface is in this case that part of the surface of the wall element on the outer side thereof, aside from the surface of the at least one solar panel, which can be reached directly by incoming sound, i.e. without preceding reflection or deflection of the sound being required. Parts of the surface of the wall element covered by a solar panel for incoming sound therefore cannot be ascribed to the sound absorption surface. The area of the elevation view of the wall element corresponds to the area of an outline of the wall element in a side view of the outer side. More precisely the area of the elevation view of the outer side is therefore meant, i.e. in the viewing direction normal to the vertical and normal to the longitudinal extension of the wall element onto the at least one outer side. As a result of the inclination of the sound absorption surface at least in some sections, its area is greater than the area of its own elevation view. The relative difference between the two areas depends on the angle of inclination. In the case of an angle of inclination of 45°, the ratio of elevation view area to surface area is approximately 1:1.4 (1 to square root of 2). From this it follows that if approximately 71% of the elevation view is formed by sound absorption surfaces inclined by 45° and solar panels occupy the remaining 29% of the elevation view, the area of the sound absorption surface is at least equal to the area of the elevation view of the wall element. The outer side can be a sound-facing side. The vertical is in this case that axis extending between the lower side and the upper side of the wall element. The designation as "vertical" is not restricted to the use of the wall element which accordingly can also be used for obliquely positioned noise protection walls without departing from the subject matter of claim 1. In the case of a typically vertically positioned noise protection wall made of the wall elements described here, the vertical corresponds to the absolute vertical of the noise protection wall. The vertical is, for example, normal to a longitudinal direction of the wall element. The elevation view area as defined above then corresponds to the area of a projection of the wall element into a plane spanned by the vertical and the longitudinal direction.

The incoming sound (sound immission) certainly reaches the sound absorption surface directly but not necessarily horizontally (normally onto the vertical). Since the most part of the sound immission is expected from a relatively small area of the solid angle, it is advantageous if the area of those sections of the sound absorption surface which can be reached directly by sound coming from a noise immission area is (overall) at least equal to the area of an elevation view of the wall element, wherein the noise immission area comprises an angular range between a normal to the vertical and an inclination set at 70° from this normal in the direction of an underside of the wall element. Optionally the above condition for the area of the sections of the sound absorption surface can already be satisfied in a noise immission area having an angular range between a normal to the vertical (hereinafter this normal is briefly designated as 0°) and an inclination set at 60° from this normal in the direction of an underside of the wall element or in an angular range between 0° and 50° or in an angular range between 0° and 40° or in an angular range between 0° and 30° or in an angular range between 0° and 20° or in an angular range between 0° and 10°.

The area of the sound absorption surface can correspond to about 1.2 times or more times the area of an elevation view of the wall element. As a result of the larger sound absorption surface, the sound absorption properties of the wall element are further improved and with a given absorber material, e.g. the body, a better degree of sound absorption can be achieved (i.e. more sound or sound energy is absorbed). Optionally the area of those sections of the sound absorption surface which can be reached directly by sound incoming from the noise immission area, correspond (overall) to at least 1.2 times the area of an elevation view of the wall element.

Furthermore, the body can have an upper bearing face and a lower bearing face for stacking a plurality of wall elements in a stacking direction, wherein the bearing surfaces are arranged at least partially substantially normal to the vertical. The bearing surfaces enable an arrangement of a plurality of wall elements adjacent to one another in the direction of the vertical so that a noise protection wall of different height can be formed depending on the number of rows of wall elements.

According to a further exemplary embodiment, in a viewing direction normal to the solar panel the sound absorption surface is covered by the solar panel at least for the most part. Assuming an incidence of light normal to the solar panel (corresponds to the optimal efficiency), the sound absorption surface then lies at least for the most part in the shadow of the solar panel. This arrangement of the solar panel and the sound absorption surface enables a particularly high usage of the incident solar energy. It is in this case irrelevant whether the sound absorption surface lies through a solar panel of the same wall element or a neighbouring or adjacent wall element arranged thereabove along the vertical.

Optionally the sound absorption surface can be arranged in a noise protection wall comprising the wall element completely within a shadow line between an upper edge of a lower solar panel and a lower edge of an upper solar panel. In this way, it can be avoided that the profile of the sound absorption surface adversely affects the efficiency of the solar panels by shading.

In this connection, according to a special embodiment of the body, on the at least one outer side outside the solar panel the body can have at least one elevation for enlarging the sound absorption surface, wherein an outer edge of the elevation contacts the shadow line or lies inside the shadow line. With such an elevation the space inside the shadow line can be optimally utilized to enlarge the sound absorption surface without adversely affecting the efficiency of a solar panel (of the same or an adjacent wall element) possibly arranged thereunder.

Alternatively or additionally, the distance between adjacent solar panels in the direction of the vertical of a noise protection wall comprising the wall element can be selected so that the shadow line between these solar panels is arranged substantially normally on the front side of at least one solar panel. In this arrangement, assuming an incidence of light normally to the solar panel (corresponds to optimal efficiency), the upper solar panel casts no shadow onto the lower solar panel. An optimal utilization of the available photovoltaic area can thus be achieved.

Furthermore, in a side view of the outer side the distance between adjacent solar panels in the direction of the vertical can be greater than or equal to the distance between an upper edge and a lower edge of a solar panel. In other words, in this configuration the solar panels occupy 50% or less of the elevation view. As a result, very flat angles of inclination (less than 30°) of the sound absorption surface and accompanying this, very pointed edges (enclosed angle less than 60°) can be avoided which could have a restrictive effect on the material which can be used for the body without endangering its structural integrity.

The body can, for example, substantially consist of a sound-absorbing material. The sound-absorbing material can be suitable for forming a support structure for the solar panel. A material having a degree of sound absorption of, for example, at least 4 dB is understood here as sound-absorbing material. The sound-absorbing material can, for example, be wood concrete (or "woodcrete", German: "Holzbeton"). Within the framework of the present disclosure, the body can also consist of another sound-absorbing material such as, for example, of perforated concrete.

BRIEF DESCRIPTION OF THE DRAWINGS

The invention will be explained in further detail hereinafter with reference to particularly preferred exemplary embodiments to which, however, it should not be restricted and with reference to the drawings. The drawings show in detail.

DESCRIPTION OF EXAMPLE EMBODIMENTS

Figure 1:
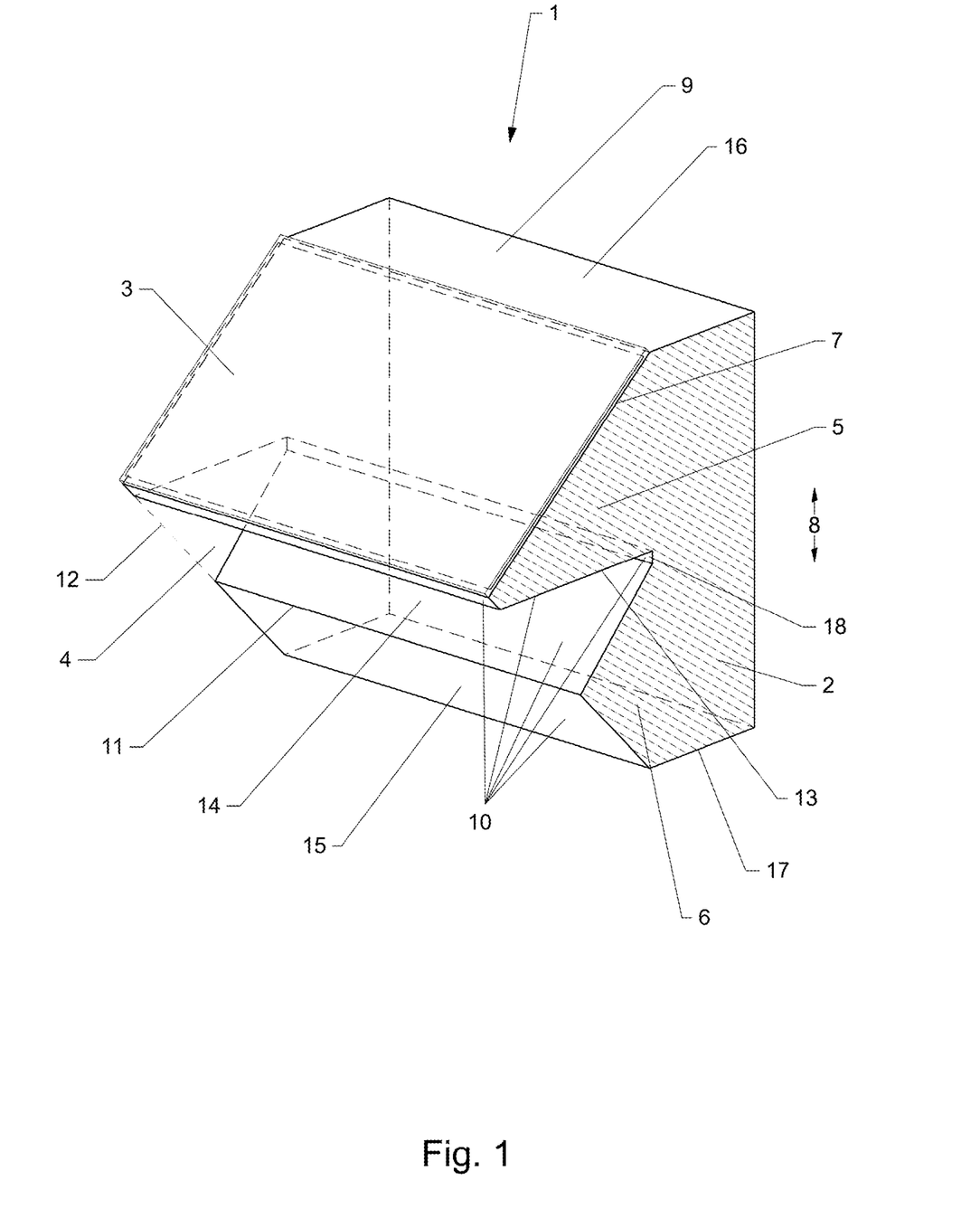
FIG. 1 shows a diagrammatic view of a first embodiment of the disclosed wall element.
Figure 2:
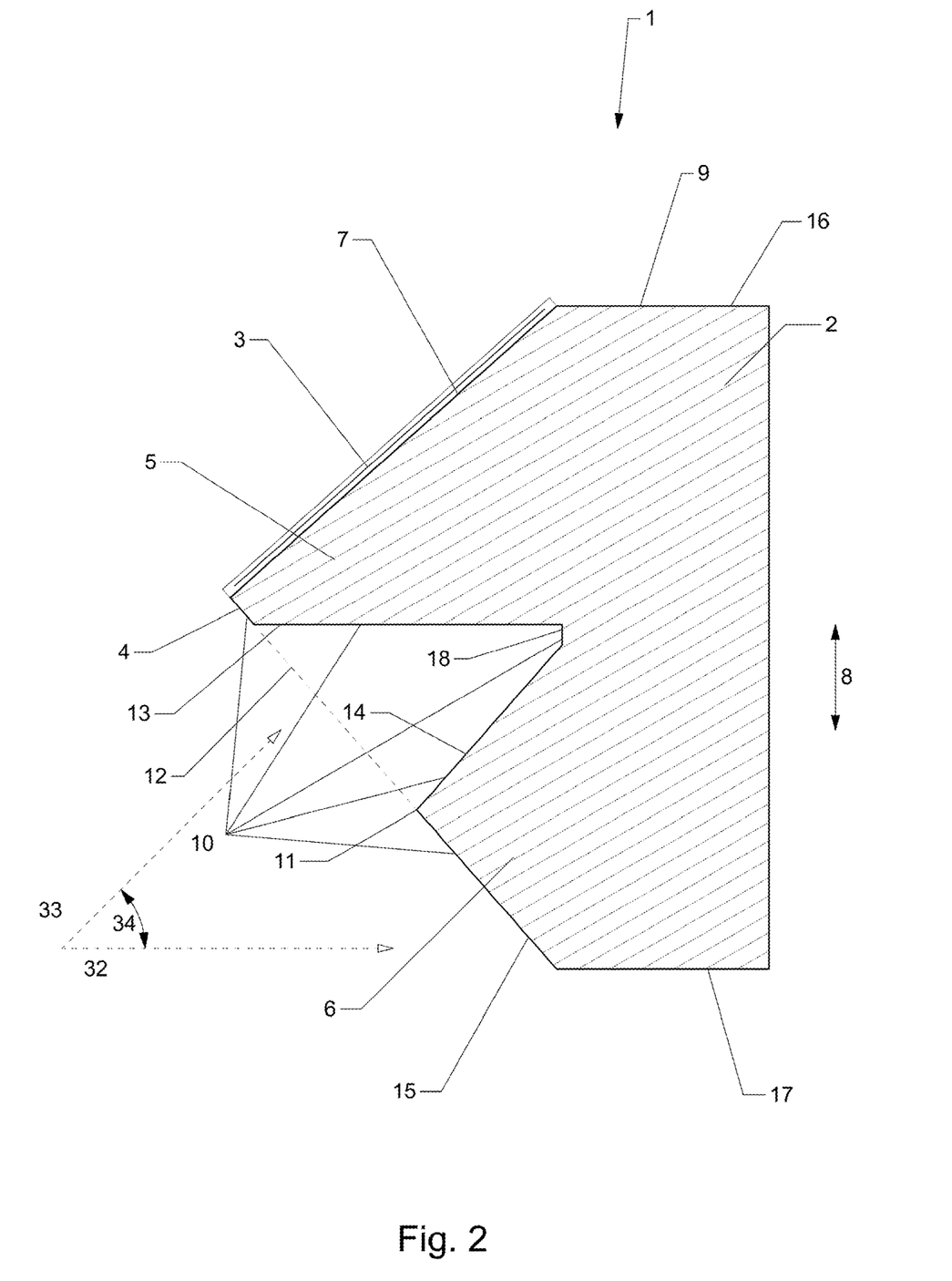
FIG. 2 shows schematically a vertical section of the first embodiment of the disclosed wall element.

FIG. 1 and FIG. 2 show a wall element 1 for a noise protection wall. The wall element 1 comprises a body 2 made of wood concrete and a solar panel 3. The wall element 1 has an outer side 4 (also front side). The body 2 has two elevations 5, 6 or projections on the outer side 4. The first elevation 5 forms a support 7 towards the outer side 4 on which the solar panel 3 is arranged and connected to the body 2. The solar panel 3 is inclined in relation to a vertical 8 in the direction of an upper side 9 of the wall element 1.

In addition, on the outer side 4 the body 2 has a sound absorption surface 10 which can be reached directly by incoming sound from a noise immission area corresponding to an angular range 34 from normal (i.e. parallel to the normal 32) or as far as an inclination 33 of 45° below the normal 32 to the vertical 8. The second elevation 6 is arranged outside the solar panel 3, more precisely aside or adjacent to the solar panel 3 and is used to enlarge the sound absorption surface 10 wherein an outer edge 11 of the elevation 6 contacts a shadow line 12 underneath the solar panel 3 so that the elevation 6 comes to lie inside the shadow line. The sound absorption surface 10 is completely covered by the solar panel 3 in a viewing direction normal to the solar panel 3.

As a result of the geometry of the second elevation 6 (having a triangular profile), the sound absorption surface 10 is substantially divided into three sections 13, 14 and 15 which are inclined or normal in relation to the vertical 8 of the wall element 1. The area of the sound absorption surface 10 is greater than the area of an elevation view of the wall element 1, e.g. by about 1.2 times.

Figure 3:
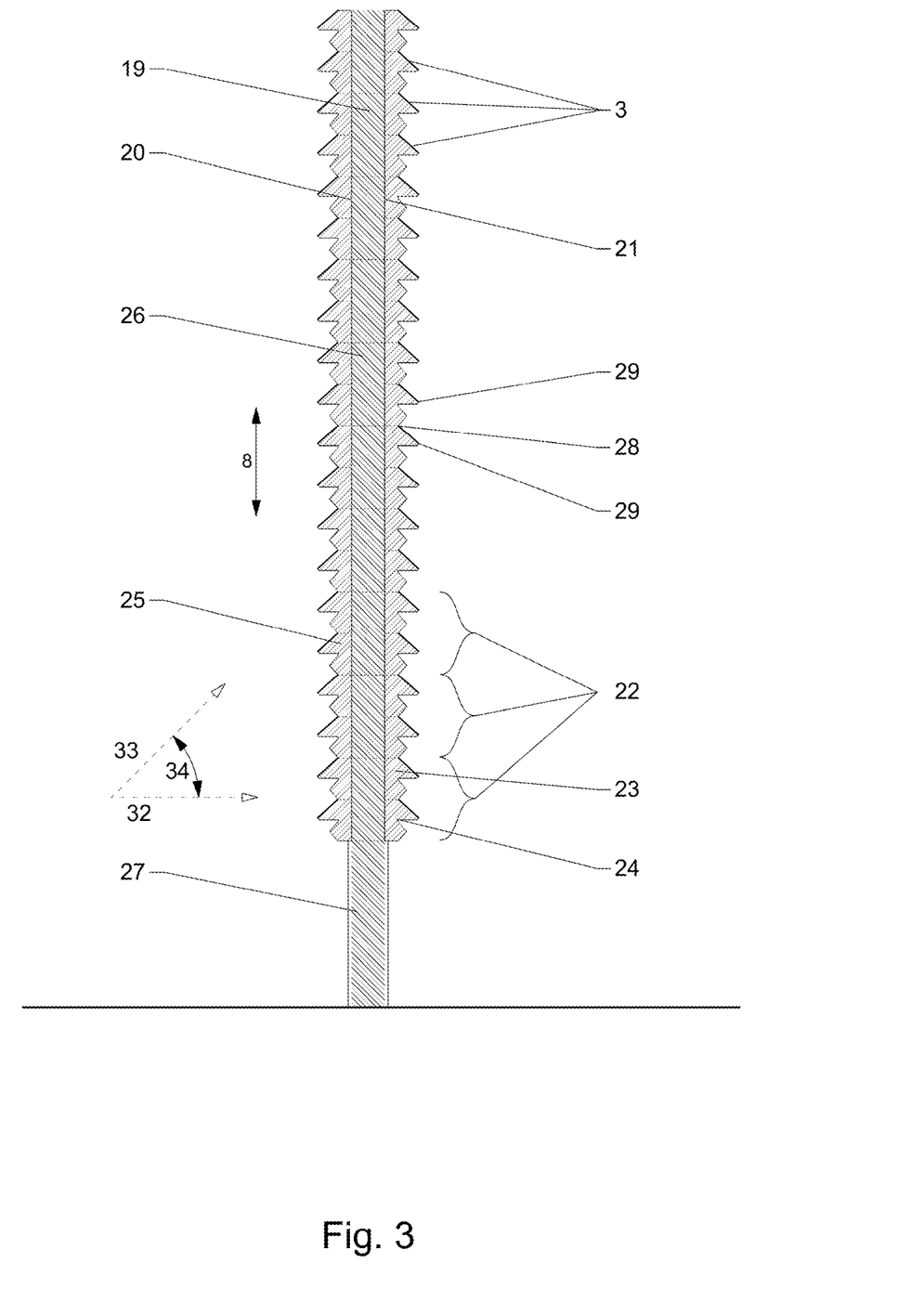
FIG. 3 shows schematically a vertical section of a noise protection wall with wall elements arranged on both sides.

The body 2 comprises an upper bearing surface 16 and a lower bearing surface 17 for stacking a plurality of wall elements 1 in a stacking direction (compare FIG. 3). The bearing surfaces 16, 17 are for the most part arranged substantially normal to the vertical 8.

In the possible embodiment described, in addition to the three inclined or horizontal sections 13, 14 and 15, the sound absorption surface 10 has a fourth section 18 arranged parallel to the vertical between the two elevations 5, 6 which should avoid possibly problematic acute angles between the two elevations 5, 6 in manufacture. For the same reason the tip (outer edge) of the first elevation 5 is bevelled.

FIG. 3 shows a noise protection wall 19 in which a plurality of wall elements 22 are arranged above one another on both sides 20, 21. The individual wall elements 22 are constructed of two modules 23, 24 wherein the individual modules 23, 24 each correspond to a wall element 1 according to the embodiment according to FIG. 1 and FIG. 2 and the two modules 23, 24 comprise a common continuous body 25 so that two modules 23, 24 together form a wall element 22 (with accordingly two solar panels). The noise protection wall 19 comprises a supporting core 26, e.g. made of reinforced concrete or a framework lightweight construction between steel uprights (upright spacing, e.g. 165, 200 or 500 cm) as well as a base region 27 made of concrete.

The distance between adjacent solar panels 3 of the noise protection wall 19 in the direction of the vertical is selected so that the shadow line 12 between these solar panels 3 is substantially normal to the outer side of the solar panel 3 arranged parallel in this example. In a side view of the outer side 4 (not shown but identifiable from the depicted profile), the distance between neighbouring solar panels 3 in the direction of the vertical (for example, 14 cm) is greater than or equal to the distance between an upper edge 28 and a lower edge 29 of a solar panel 3 (for example, 11 cm). The sound absorption surfaces 10 of the wall elements 22 are in each case arranged completely inside a shadow line 12 between an upper edge 28 of a lower solar panel 3 and a lower edge 29 of an upper solar panel 3.

The wall elements 22 (with a module height of, for example, 25 cm and a corresponding element height of, for example, 50 cm) are stacked so that the bearing surfaces 16, 17 of neighbouring wall elements 22 contact each other. The width of the solar panels 3 is, for example, 16.5 cm. The individual wall elements 22 are connected to the supporting core 26, for example, glued on or screwed on.

Figure 4:
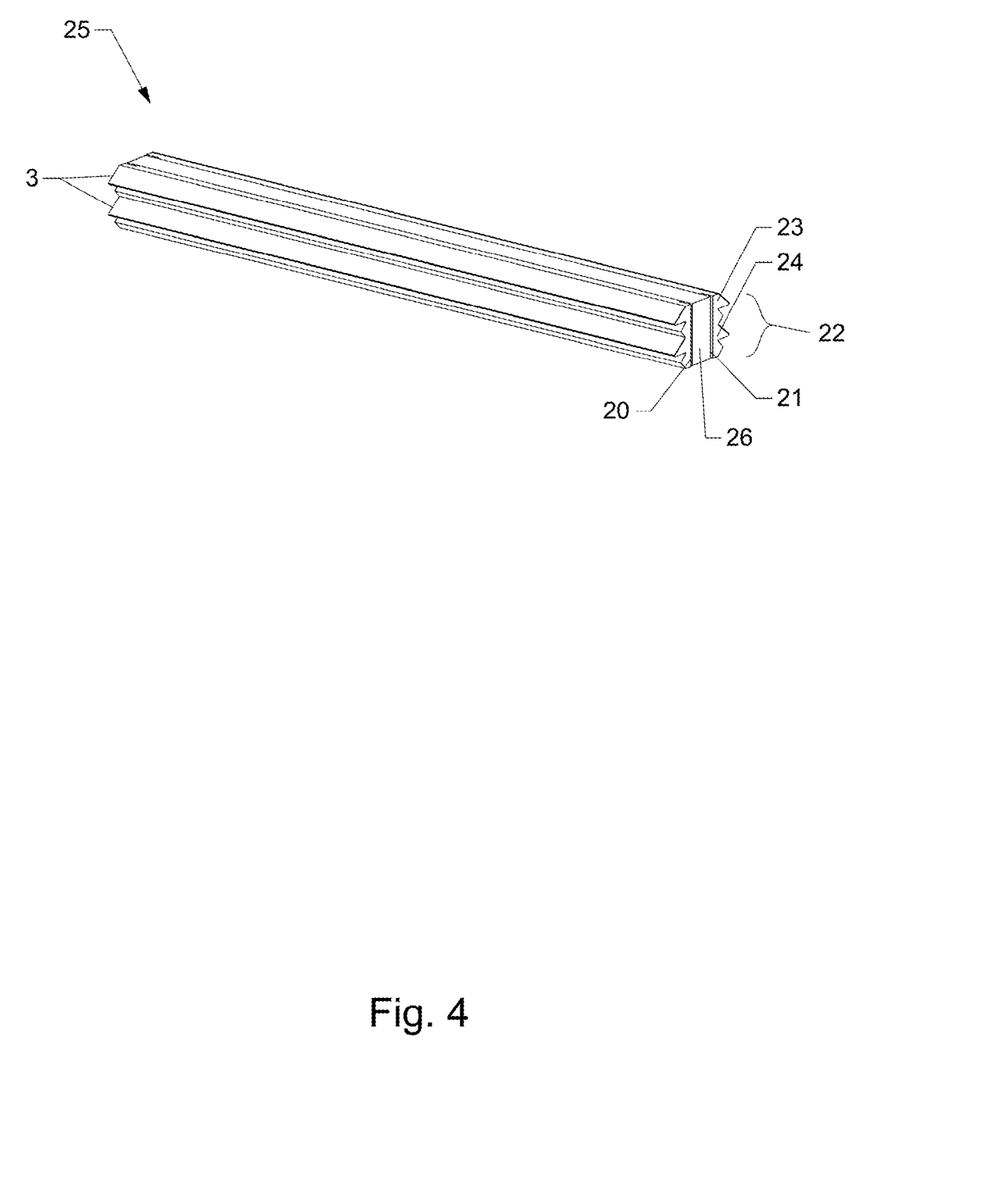
FIG. 4 shows a diagrammatic view of a wall module with wall elements arranged on both sides.

FIG. 4 shows schematically a section of the noise protection wall 19 corresponding to a wall module. The wall module comprises a section of the core 26. Respectively one wall element 22 with a continuous body 25 is arranged on both sides 20, 21 of the core section. Each band element in this case comprises two modules 23, 24 which are each fitted with a solar panel 3. The wall module depicted here for example has a dimension along the vertical 8 (height) of about 50 cm. Each module 23, 24 or each row of modules is therefore about 25 cm high. The solar panels 3 are in this case about 16.5 cm wide. Alternatively it can be provided that a wall module of this height has three rows of modules wherein the solar panels have a width of about 12.5 cm. However it is also feasible to provide a wall module with only one row of modules, e.g. having a height of 25 cm.

Figure 5:
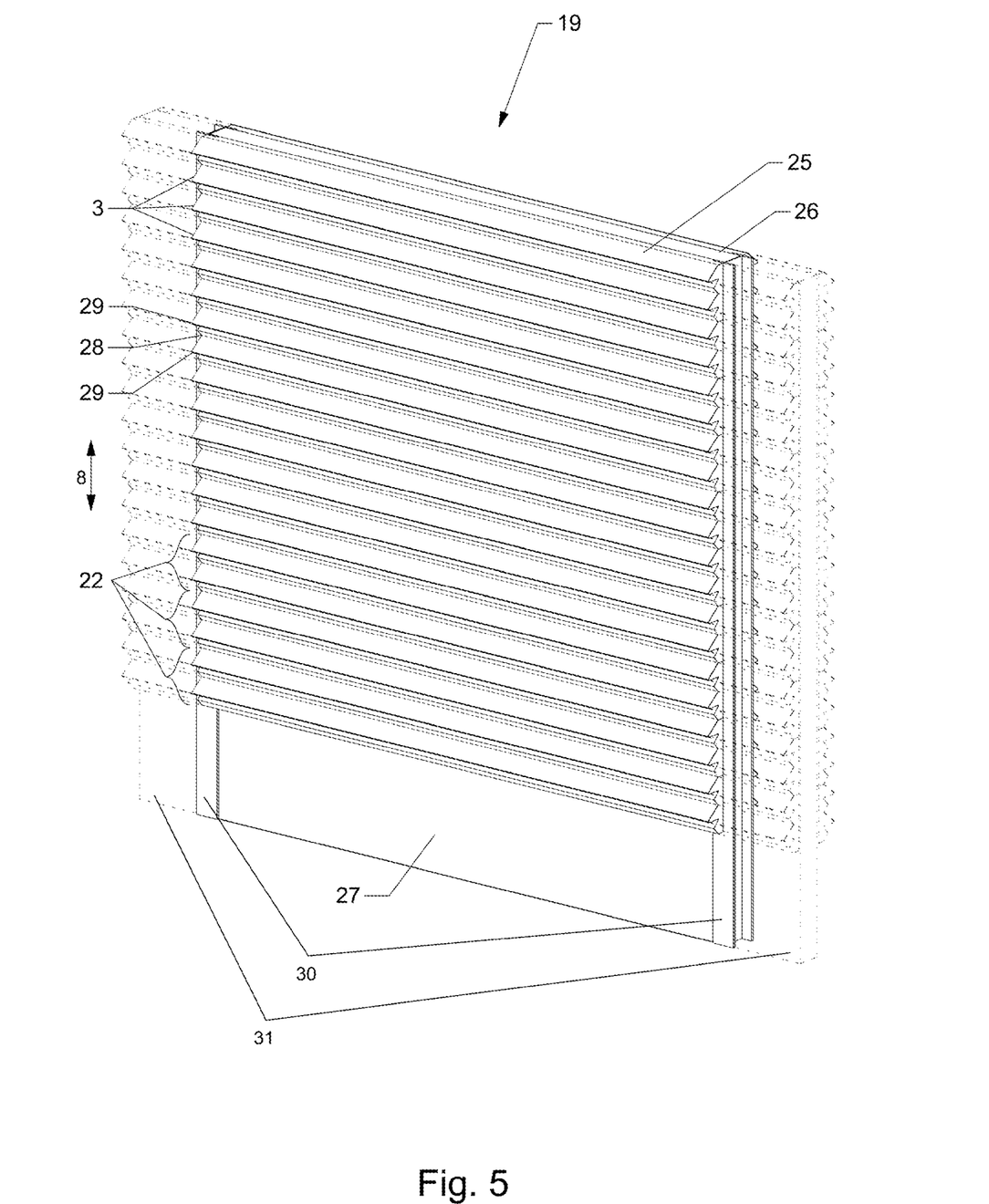
FIG. 5 shows a diagrammatic view of a noise protection wall with wall elements arranged on both sides.

FIG. 5 shows a diagrammatic view of a noise protection wall 19 with wall elements arranged on both sides comparable to FIG. 3. The noise protection wall 19 is divided in the longitudinal direction into sections which are each delimited by steel uprights 30, supported and anchored in the ground. The neighbouring noise protection wall sections 31 in the longitudinal direction are shown by dashed lines in FIG. 5 in order to illustrate the continuation of the noise protection wall by repetition in rows or juxtaposition of a plurality of noise protection wall sections.

The invention claimed is:

1. Wall element for a noise protection wall, wherein the wall element has a body and at least one outer side,
   wherein the body has a support towards the at least one outer side,
   wherein at least one solar panel is arranged on the support and is connected to the body, wherein the solar panel is inclined relative to a vertical in the direction of an upper side of the wall element,
   wherein the body on the at least one outer side has at least one sound absorption surface, wherein the at least one sound absorption surface is directly accessible to incoming sound,
   wherein the at least one sound absorption surface is inclined at least in some sections relative to at least one of the vertical and a longitudinal direction of the wall element, wherein an area of the sound absorption surface is at least equal to an area of an elevation view of the wall element.

2. The wall element according to claim 1, wherein an area of sections of the sound absorption surface which are directly accessible to sound coming from a noise immission area is at least equal to the area of the elevation view of the wall element, wherein the noise immission area comprises an angular range between a normal to the vertical and an inclination set at 70° from this normal in the direction of an underside of the wall element.

3. The wall element according to claim 1, wherein the area of the sound absorption surface corresponds to about 1.2 times or multiple times the area of the elevation view of the wall element.

4. The wall element according to claim 1, wherein the body has an upper bearing face and a lower bearing face for stacking a plurality of wall elements in a stacking direction, wherein the bearing surfaces are arranged normal on the vertical.

5. The wall element according to claim 1, wherein in a viewing direction normal to the solar panel the sound absorption surface is at least predominantly covered by the solar panel.

6. The wall element according to claim 1, wherein the at least one sound absorption surface is arranged in a noise protection wall comprising the wall element completely within a shadow line between an upper edge of a lower solar panel and a lower edge of an upper solar panel.

7. The wall element according to claim 6, wherein on the at least one outer side outside the solar panel the body has at least one elevation for enlarging the at least one sound absorption surface, wherein an outer edge of the elevation contacts the shadow line or lies inside the shadow line.

8. The wall element according to claim 6, wherein a distance between adjacent solar panels in a direction of the vertical of a noise protection wall comprising the wall element is selected so that the shadow line between the adjacent solar panels is arranged normal on the front side of at least one solar panel.

9. The wall element according to claim 1, wherein in an elevation view of the outer side a distance between adjacent solar panels in a direction of the vertical is greater than or equal to a distance between an upper edge and a lower edge of a solar panel.

10. The wall element according to claim 1, wherein the body consists predominantly of a sound-absorbing material.

11. The wall element according to claim 10, wherein the body consists predominantly of wood concrete.

\* \* \* \* \*